US006678521B1

(12) United States Patent
Sombrin

(10) Patent No.: US 6,678,521 B1
(45) Date of Patent: Jan. 13, 2004

(54) METHOD FOR DETERMINING AMPLITUDES AND PHASES OF THE DIFFERENT CHANNELS IN AN ELECTROMAGNETIC SIGNAL TRANSMISSION NETWORK, SUCH AS A TELECOMMUNICATION SATELLITE ANTENNA

(75) Inventor: Jacques Sombrin, Toulouse (FR)

(73) Assignee: Centre National D'Etudes Spatiales, Paris (FR)

( * ) Notice: Subject to any disclaimer, the term of this patent is extended or adjusted under 35 U.S.C. 154(b) by 0 days.

(21) Appl. No.: 09/701,848

(22) PCT Filed: Jun. 4, 1999

(86) PCT No.: PCT/FR99/01318

§ 371 (c)(1), (2), (4) Date: Jan. 31, 2001

(87) PCT Pub. No.: WO99/63625

PCT Pub. Date: Dec. 9, 1999

(30) Foreign Application Priority Data

Jun. 4, 1998 (FR) .......................................... 98 07021

(51) Int. Cl.[7] .................................................. H04Q 7/20

(52) U.S. Cl. ..................... 455/430; 455/12.1; 455/13.3; 455/427; 343/700 R; 370/203; 370/211

(58) Field of Search ................................ 455/430, 427, 455/562, 12.1, 13.3, 67.11; 343/700, 824, 895; 370/203, 210

(56) References Cited

U.S. PATENT DOCUMENTS 5,471,224 A * 11/1995 Barkeshli .................... 343/909
5,838,282 A * 11/1998 Lalezari et al. ............. 343/727
6,031,491 A * 2/2000 Daniel et al. ........ 343/700 MS

OTHER PUBLICATIONS

L.E. Corey, J.C. Weed and T.C. Speake, "Modeling Triangularly Packed Array Antennas Using a Hexagonal FFT", 1984 IEEE International Symposium Antennas and Propagation, vol. 2, Jun. 25–29, 1984, pp. 507–510 (XP–002093360).

K.S. Rao, M. Cuchanski, and M.Q. Tang, "Multiple Beam Antenna Concepts for Satellite Communications", Symposium on Antenna Technology and Applied Electromagnetics, vol. 3, Aug. 4, 1994, pp. 289–292 (XP–002093361).

S.A. Bokhari, N. Balakrishnan and P.R. Mahapatra, "An Algorithm for the Pattern Computation of Triangular Lattice Phased Arrays", IEEE International Symposium Antennas and Propagation, vol. 1, 1987, pp. 137–140 (XP–002093362).

* cited by examiner

*Primary Examiner*—Charles Appiah
*Assistant Examiner*—Khawar Iqbal
(74) *Attorney, Agent, or Firm*—Morgan & Finnegan LLP

(57) ABSTRACT

Amplitudes and phases of different channels in an electromagnetic signal transmission network, whereof the sources are arranged in a triangular lattice, are determined by tiling the lattice with hexagons having six equal sides, the hexagonal tiles that are formed are distributed on the lattice such that two successive tiles along a direction in the lattice rectangular height equivalent to the triangular lattice are offset by an elementary step along the width direction. A Fourier transform is performed on the resulting tiles; directions are selected on the resulting new lattice corresponding to the transmission directions; an inverse Fourier transform is performed of the directions; and amplitude and phase coefficients to be applied to the transmission network different channels are deduced from the inverse Fourier transform.

2 Claims, 1 Drawing Sheet

METHOD FOR DETERMINING AMPLITUDES AND PHASES OF THE DIFFERENT CHANNELS IN AN ELECTROMAGNETIC SIGNAL TRANSMISSION NETWORK, SUCH AS A TELECOMMUNICATION SATELLITE ANTENNA

BACKGROUND OF THE INVENTION

1. Filed of the Invention

The present invention relates to a method of determining the amplitudes and phases to be applied to the various channels of an electromagnetic signal transmission network.

2. Background of the Invention

It is advantageously applicable in determining the amplitudes and phases to be applied to the various channels of a telecommunications satellite antenna.

Conventionally, these amplitudes and phases are calculated by implementing inverse Fourier transform processes.

The free-space radiation pattern at infinity is obtained to a first approximation by applying the field Fourier transform to the aperture of the antenna. For a given direction, the field can thus be obtained to the first order by the inverse Fourier transform of a pattern which concentrates the energy transmitted in said direction. The result is a complex vector which gives the amplitudes and phases at the various sources of the array antenna.

Implementing a complete network requires the same calculation to be performed for different directions.

Such processing is simple to implement when the various sources and directions occupy a regular square or rectangular grid since two-dimensional fast Fourier transform (FFT) algorithms can be applied easily.

It is more difficult to perform when the various sources are on a regular triangular grid giving hexagonal cells. Nevertheless, this configuration is the more advantageous, in particular for the antennas of telecommunications satellites for use with mobile stations.

It is known that on the ground it is desirable to implement cells that are hexagonal, thus enabling better uniformity in the power received than with cells that are rectangular or square, and even that it is desirable to use circular or hexagonal elements for the transmission network since they enable the plane to be tiled with amplitude that is more uniform. The overall shape of the antenna must itself approximate to a circle or a hexagon.

An algorithm known as the hexagonal FFT is used for this purpose, which algorithm is derived from the rectangular FFT algorithm by eliminating every other point in a staggered configuration and by choosing a ratio of $\sqrt{3}$ between the height and the width of the unit pitches dy and dx of the rectangles.

An effect of this staggered sampling of the starting domain is to require the transformed domain to be tiled in a staggered configuration. Likewise, sampling the transformed domain in a staggered configuration requires the starting domain to be tiled in a staggered configuration.

Nevertheless, the solutions that have been proposed until now for tiling a triangular grid with hexagons are not entirely satisfactory.

As shown in FIG. 1, the solution that is generally used consists in shortening three sides of each hexagon. Hexagons with three short sides can be used to tile the triangular grid in a staggered configuration, with the staggered tiling being reducible to normal rectangular tiling by considering two hexagons, thus giving a total number of working points equal to $6n^2$.

For a description of that solution, reference can advantageously be made to the following publication:

"The processing of hexagonally sampled two-dimensional signals" by R. Mersereau, Proceedings of the IEEE, Vol. 67, No. 6, June 1979.

That type of sampling nevertheless suffers from the drawback of disturbing the uniformity and order 6 symmetry of the power distribution, particularly for hexagons of small size.

In particular, a hexagon of side of length n (n+1 points along a side) has $N=3n(n+1)+1$ points whereas a hexagon with three short sides has only $3n^2$ points, which for small values gives the following table:

| Side n | 0 | 1 | 2 | 3 | 4 | 5 | 6 | 7 | 8 |
|---|---|---|---|---|---|---|---|---|---|
| $3n^2$ | 0 | 3 | 12 | 27 | 48 | 75 | 108 | 147 | 192 |
| $3n(n + 1) + 1$ | 1 | 7 | 19 | 37 | 61 | 91 | 127 | 169 | 217 |

SUMMARY OF THE INVENTION

The present invention proposes a method in which a triangular grid is tiled by means of complete hexagons.

Thus, the invention provides a method of determining the altitudes and phases to be applied to the various channels of an electromagnetic signal transmission network whose sources are disposed in a triangular grid, the method being characterized in that said grid is tiled with hexagons having six equal sides, the hexagon tiles implemented in this way being distributed over said grid in such a manner that two successive tiles in the height direction of the rectangular grid equivalent to said triangular grid are offset in the width direction by one unit pitch, in that a Fourier transform is applied to the resulting tiling, in that the directions corresponding to the transmission directions are selected on the resulting new grid (result of the transform), in that the inverse Fourier transform is implemented on those directions, and in that the amplitude and phase coefficients to be applied to the various channels of the transmission network are deduced from said inverse Fourier transform.

BRIEF DESCRIPTION OF THE DRAWINGS

Other characteristics and advantages appear further from the following description. The description is purely illustrative and non-limiting, and should be read with reference to the accompanying drawing, in which.

DETAILED DESCRIPTION OF THE PREFERRED EMBODIMENT

Figure 1:
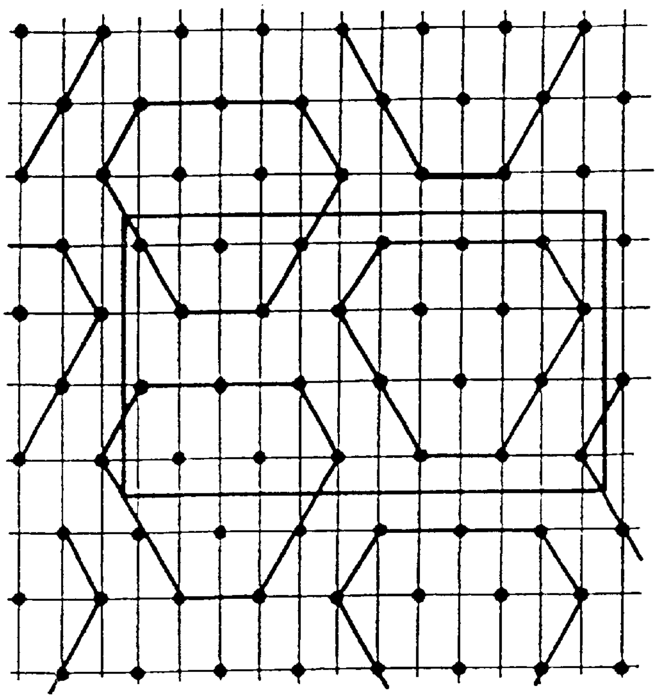
FIG. 1 shows hexagonal tiling known in the prior art for tiling a triangular grid.
Figure 2:
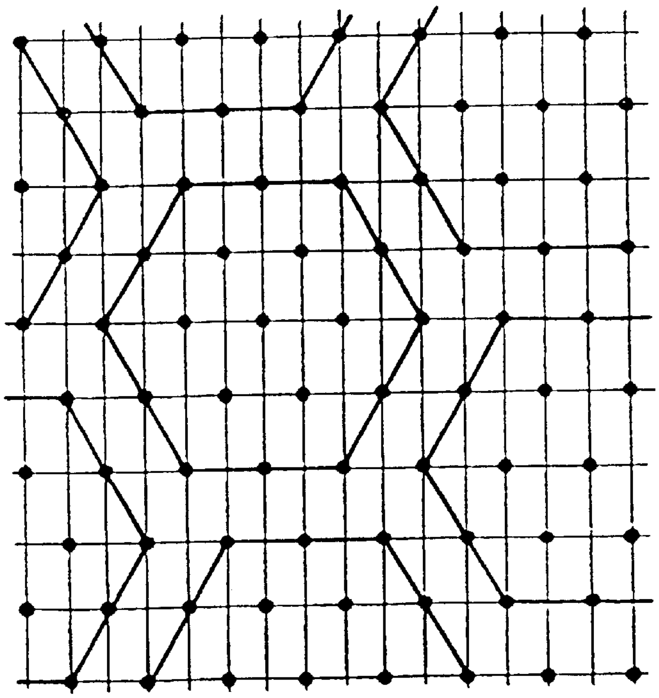
FIG. 2 shows hexagonal tiling of the type used with a method constituting an implementation of the invention.

As shown in FIG. 2, in the implementation shown in this figure, the triangular grid is tiled with hexagons having all six sides equal, the hexagonal tiles being distributed over said grid in such a manner that two successive tiles in the height direction of the rectangular grid equivalent to the said triangular grid are offset in the width direction by one unit pitch.

Thus, if the center of one of the hexagonal tiles is taken as the origin (0,0), the coordinates on the rectangular grid of the centers of the six hexagonal tiles surrounding it expressed in terms of unit pitch steps in the two directions of the rectangular grid are as follows:

$$(1,-2n-1);\ (3n+2,-n);\ (3n+1,n+2);\ (-1,2n+1);\ (-3n-2,n);\ (-3n-1,-n-1)$$

where n is the length of the side of a tile.

Given that the ratio between the unit pitch in the height direction of the rectangular grid and the unit pitch in the length direction is √3, the six distances between the origin and the centers of the hexagonal tiles are identical, and when squared are as follows:

$$1+3(2n+1)^2=(3n+2)^2+3n^2=(3n+1)^2+3(n+1)^2=12n^2+12n+4=4N$$

where N is an integer.

The hexagonal tiles are thus centered on a regular triangular grid with a pitch of 2√N.

By using a rectangle of dimensions Nx=2N and Ny=2N, there are $2N^2$ working points and thus exactly 2N complete hexagons each having N working points. It is thus possible to implement a hexagonal Fourier transform. The sizes of the sides of the rectangle can be reduced when N is not a prime number.

In the general case, the grid in the transform domain is of dimensions Dx and Dy with:

$$Dx=1/(2Ndx) \text{ and } Dy=1/(2Ndy)=1/(2N\sqrt{3}dx)=Dx/\sqrt{3}$$

The Fourier transform of the hexagonal tiling distributed in a triangular grid gives sampling of the same kind in perpendicular directions having the following coordinates:

$$(2n+1,1);\ (n,3n+2);\ (-n-1,3n+1);\ (-2n-1;-1);\ (-n,-3n-2);\ (n+1,-3n-1)$$

on the Dx, Dy grid.

These directions define the directions from the centers of the cells to the ground.

M of these directions (with M<N) about a central direction are selected as directions for the beams, and the inverse Fourier transform is performed for these directions. This gives the distribution of amplitudes or phases at the sources in the plane of sources.

By truncating this distribution (e.g. for n=2, using only the sources of the hexagon which corresponds to n=1), or by reducing the amplitude on the outer sources, the beam is broadened. This makes it possible to adjust isolation between cells.

It is thus possible to obtain the amplitudes and phase coefficients that are required for all of the channels of the beam-forming network.

These values are used to adjust the matrix of phase shifters and attenuators for the various transmission channels. This adjustment can be fixed once and for ever, or it can be controllable, with the resulting beam-forming network being suitable for use with an active antenna or an array antenna.

It will be understood that the technique described above makes it possible to guarantee hexagonal symmetry (order 6) for the beams. It is advantageously used for making a satellite telecommunications antenna that enables symmetrical hexagonal cells to be implemented on the ground.

What is claimed is:

1. A method of determining the altitudes and phases of the various channels of an electromagnetic signal transmission network whose sources are disposed in a triangular grid, the method being characterized in that said grid is tiled with hexagons having six equal sides, with the sides of the hexagons passing through the centers of the sources, the points of intersection between said sides also constituting the centers of sources, the hexagon tiles implemented in this way being distributed over said grid in such a manner that two successive tiles in the height direction of the rectangular grid equivalent to said triangular grid are offset in the width direction by one unit pitch of said grid, in that a hexagonal Fourier transform is applied to the resulting tiling, in that the directions corresponding to the transmission directions are selected on the resulting new grid, in that the inverse Fourier transform is implemented on those directions, and in that the distribution of amplitudes or phases at the sources and the amplitude and phase coefficients to be applied to the various channels of the transmission network are deduced from said inverse Fourier transform.

2. A method of determining the amplitudes and phases to be applied to the various channels of a telecommunications satellite antenna, characterized in that it implements a method according to claim 1.

* * * * *